United States Patent [19]

Kopf

[11] 4,366,303

[45] Dec. 28, 1982

[54] PARTICULATE RESOLES WITH IMPROVED CURE RATE AND SINTER RESISTANCE

[75] Inventor: Peter W. Kopf, Hillsborough Township, Somerset County, N.J.

[73] Assignee: Union Carbide Corporation, Danbury, Conn.

[21] Appl. No.: 329,871

[22] Filed: Dec. 11, 1981

[51] Int. Cl.$^3$ .................. C08G 8/28; C08G 14/06; C08G 14/12

[52] U.S. Cl. .................. 528/129; 428/526; 428/529; 524/29; 524/33; 524/49; 524/459; 524/595; 524/596; 525/480; 525/504; 528/140; 528/147; 528/155; 528/162; 528/165

[58] Field of Search ............ 528/129, 140, 155, 147, 528/162, 165; 525/480, 504; 524/29, 33, 49, 459, 595, 596

[56] References Cited

U.S. PATENT DOCUMENTS

| 1,807,545 | 5/1931 | Ostersetzer et al. | 528/165 X |
| 2,608,536 | 8/1952 | Sterling | 525/504 X |
| 4,206,095 | 6/1980 | Wynstra et al. | 528/129 X |
| 4,269,949 | 5/1981 | Hickson et al. | 528/165 X |

Primary Examiner—Howard E. Schain
Attorney, Agent, or Firm—Francis M. Fazio

[57] ABSTRACT

Particulate resoles are produced by mixing phenol, formaldehyde and amine in an aqueous medium containing a protective colloid. The resoles exhibit improved cure rate and sinter resistance when an alkaline compound is added to the reaction mixture after particulate formation.

6 Claims, No Drawings

1

PARTICULATE RESOLES WITH IMPROVED CURE RATE AND SINTER RESISTANCE

BACKGROUND OF THE INVENTION

1. Field of the Invention

This invention relates to a process for producing improved particulate resole resins, as well as to the resins so produced.

2. Description of the Prior Art

U.S. Pat. No. 4,206,095 (Wynstra et al.) describes a process for the production of particulate solid, heat-reactive, substantially water-insoluble resoles. The process comprises the steps of: (a) reacting formaldehyde, a phenol, and hexamethylenetetramine or a compound containing amino hydrogen, in an aqueous medium containing an effective amount of certain protective colloids, for a period of time and at a temperature sufficient to produce an aqueous dispersion of a particulate solid, heat-reactive, substantially water-insoluble thermosetting resole; and (b) recovering the particulate resole from the aqueous dispersion.

These resole resins, however, because of chemical composition boundaries, have a limited range of reactivity as is well known to those skilled in the art. Extensive analysis, using AMOE molding evaluations as well as dynamic mechanical analysis, shows that the cure rate of these resoles is slower than that of many other known resole and novolac resins. This slower cure rate limits the use of these resole products in such applications as molding compound resins and wafer board. A rapid cure rate is especially important in wafer board manufacture where cycle times are commercially critical. Another property of these resoles for which improvement is desirable is their sinter resistance. The fiber bonding product produced using these resoles has exhibited sinter resistance inferior to pulverized two-step resins. The sinter resistance is controlled primarily by the glass transition temperature (hereinafter referred to as "$T_g$") of the resole resin. Increasing the $T_g$ of these resoles from 5° to 15° C. would improve the sinter resistance to the point where they would be comparable to novolac resin intermediates having high sinter resistance.

It would, therefore, be desirable to develop a particulate resole resin having an improved cure rate and sinter resistance so that particulate resoles could be applied in those areas where such properties are required.

SUMMARY OF THE INVENTION

The present invention relates to a process for producing improved particulate, resole resins. The process comprises the steps of: (a) reacting (1) formaldehyde, (2) phenol, and (3) an effective amount of hexamethylenetetramine or a compound containing amino hydrogen, or mixtures thereof; in an aqueous medium containing an effective amount of a protective colloid, for a period of time sufficient to produce a particulate, resole resin dispersed in the aqueous medium; (b) cooling the reaction mixture to below about 40° C.; (c) reacting the cooled reaction mixture with an alkaline compound for a period of time sufficient to convert a sufficient amount of the hydroxylic groups in the resin to form alkaline phenates; and (d) recovering the resin from aqueous dispersion; said resin exhibiting increased cure rates and increased sinter resistance. The present invention also provides for the particulate resole resin produced by this process.

DETAILED DESCRIPTION OF THE INVENTION

Definitions

The following definitions apply to this invention:

Particulate—this term refers to a finely divided solid having a maximum particle size on the order of 500 microns. Preferably, the particle size average is about 5 to 50 microns. The particles are solid in the sense that the resin has a glass transition temperature, $T_g$, above about 30° C., and preferably above about 40° C.

Phenolic Resin—a condensation product of a phenol and an aldehyde, usually formaldehyde.

Resole—a phenolic resin produced using at least equimolar amounts of phenol and aldehyde, and usually more, of aldehyde. Base catalysts are ordinarily used in making resoles. As used in the art, "resole" refers to phenolic resins that contain useful reactivity, as opposed to the fully polymerized or cured resins.

Protective Colloid—a composition that is capable of promoting the production of, or of maintaining, a phenolic resin-in-water dispersion wherein the phenolic resin is the dispersed phase and the aqueous medium is the dispersing or continuous phase.

Aqueous Dispersion—an aqueous dispersion is a dispersion wherein the dispersing or continuous phase is composed primarily of water, although some organic material will be dissolved in the aqueous phase and some water will be contained in the dispersed resin phase.

Amino-Hydrogen—refers to a hydrogen atom bonded directly to an amino nitrogen, such as in ammonia. As used herein, the term excludes amido hydrogens wherein the nitrogen is alpha to a carbonyl group.

Particulate Resole Formation

In the first step of the process of the invention, formaldehyde is reacted with a phenol and hexamethylenetetramine or a compound containing at least one amino hydrogen, in an aqueous medium in the presence of a protective colloid.

The formaldehyde utilized as a reactant is most conveniently and economically employed in the form of the aqueous solution known as "formalin", containing preferably 37 to 50 weight percent formaldehyde, although other forms, such as paraform and trioxane, can be used.

The phenol reactant can be a trifunctional phenol, such as monohydroxybenzene, m-cresol or resorcinol, or a tetrafunctional phenol, such as 2,2-bis(4-hydroxyphenyl)-propane ("bisphenol-A"), and mixtures thereof. Para-substituted phenol such as p-cresol, p-chlorophenol, and p-t-butylphenol, can also be used but only as a fraction of the phenol part of the formulation. When p-t-butylphenol was used with monohydroxybenzene in amounts of at least about 50 mole percent or more of the butyl phenolic component, a non-thermosetting product was produced. The reason for this failure to produce a thermosetting product is postulated to be that the p-alkylphenols lack sufficient reactivity toward formaldehyde under the conditions of the process of this invention. Compared to conventional resole processing using a melt, at 100° C. or higher, and at a pH of 8, the conditions in the present invention are quite mild as having 30 percent by weight of more water, with 30 to 50 percent being preferable, at 85° C. or even lower, and a pH of about 7 prior to the alkaline treatment. Theoretically, even a p-alkylphenol/formaldehyde/ammonia (or hexamethylenetetramine) formulation should yield a thermosetting product because of the polyfunctionality contributed by the ammonia. Routine experimentation will suffice to determine the maximum proportions of difunctional phenol component that can be used in particular cases, while still producing a thermosetting product. Preferred phenolic components include monohydroxybenzene, m-cresol and bisphenol-A.

The amine reactant is hexamethylenetetramine or a compound that contains at least one amino hydrogen. Specific illustrative examples include ammonia, hexamethylenetetramine (the two are complete equivalents in this invention), and aliphatic amines such as methylamine, dimethylamine, ethylenediamine, and monoethanolamine. Ammonia and hexamethylenetetramine are preferred.

The reactants are employed in proportions such that the resulting resole resin is a thermosetting composition. The maximum utilizable proportion of methylene is 0.5 methylene per ring hydrogen in the phenolic component that is reactive with formaldehyde. One equivalent of methylene is provided by each mole of formaldehyde, and six equivalents of methylene are provided by each mole of hexamethylenetetramine. The reactive ring hydrogens are those that are ortho and para to the phenolic hydroxyl. The operative proportions of the reactants are much broader, however, and actually cannot be stated with much precision. For instance, a large excess of methylene can be present in the reaction mixture, but the excess will either be extracted (as free formaldehyde) during subsequent washing of the resole, or it will be lost during cure. Resoles containing excess formaldehyde will also have an increased tendency to sinter. If insufficient methylenes are present in the reaction mixture, a thermosetting product can still be produced, but part of the phenolic component will remain unreacted. Much of the free phenol can be extracted from the product by washing, but it would have to be recycled to avoid waste. In almost all cases, the reaction mixture will contain from about 0.25 to about 1 methylene per reactive hydrogen in the phenol. As a guide, when monohydroxybenzene is used, preferred proportions will be from about 1.25 to about 1.75 equivalents of methylene per mole of monohydroxybenzene. The methylene can be derived from either the formaldehyde or hexamethylenetetramine or both.

As a general rule, the amine compound is used in an amount sufficient to impart a substantially hydrophobic character to the resole. Most of the amine compound reactant is apparently incorporated in the product in the form of a benzylamine, a certain minimum proportion of which appears to be required in order to impart the desired substantially water-insoluble property of the product. This minimum proportion will vary somewhat, depending on such factors as nature of reactants and proportion of methylene to phenol. When hexamethylenetetramine is used with monohydroxybenzene, the minimum is about 6 parts of hexamethylenetetramine per 100 parts, by weight, of monohydroxybenzene. When 5 parts of hexamethylenetetramine were used in a similar formulation, the resole coalesced during filtering. When hexamethylenetetramine is used with bisphenol-A, a minimum of about 3 parts of hexamethylenetetramine per 100 parts of bisphenol-A should be used. A convenient way to determine the approximate minimum proportion needed in particular cases is to vary the proportion of amine compound in a series of batches to determine at which point the product becomes sufficiently hydrophobic to be readily separable from the aqueous phase by filtration. Those products that are insufficiently hydrophobic will coalesce to an unfilterable mass (in extreme cases), or, in borderline cases, will excessively agglomerate during filtration or drying. This test is valid to give the approximate minimum of the amine needed, even though a means other than filtration, e.g., centrifugation, may be used in separating the aqueous phase from the particulate resole resin. Slightly more hexamethylenetetramine might be needed when centrifrigation is used because filtering is usually a gentler treatment. When hexamethylenetetramine is the amine compound, at least one mole of free formaldehyde, is distinguished from methylenes provided by hexamethylenetetramine, should be provided per equivalent of amino nitrogen. When ammonia is used, at least $2\frac{1}{2}$ moles of free formaldehyde should be used per mole of ammonia.

There is also a maximum amount of amine compound that should be used. Above a certain proportion of amine compound, a rapid initial reaction is obtained, but the reaction product cannot be advanced behond a certain point, as is evidenced by failure to obtain gelation on the 150° C. hotplate after 5 minutes or more. In particular cases, the precise maximum would have to be determined by routine experimentation.

The amount of amine compound that should be used is termed an "effective amount", which is defined as being above the minimum and below the maximum proportion described above.

The process of the invention also uses a protective colloid. Materials that have been found to be operative as protective colloids include gum arabic, gum ghatti, hydroxyalkyl guar gum (e.g., the ethylene oxide or propylene oxide adducts of guar gum having a minimum degree of hydroxyalkylation of about 5 weight percent), partially hydrolyzed polyvinyl alcohol, hydroxyethyl cellulose, carboxymethyl cellulose, soluble starch, and agar. Gum arabic, gum ghatti, hydroxypropyl guar gum, and partially hydrolyzed polyvinyl alcohol are preferred. Preferred commercially available polyvinyl alcohols are those having a molecular weight on the order of 10,000 and degree of hydrolysis of about 88 percent (with the remainder of the units in the polymer chain being vinyl acetate). Higher molecular weight versions of partially hydrolyzed polyvinyl alcohol (about 96,000 and about 125,000 molecular weights) would yield coarser particle size dispersions, and may generate a dispersion too poor to permit isolation of a particulate solid, i.e., the resin would coalesce. Lower molecular weight versions (about 3,000 molecular weight) of 88 percent hydrolyzed polyvinyl alcohol, and a 99 percent hydrolyzed 10,000 molecular weight version of polyvinyl alcohol, would be unsatisfactory in that the reaction mixtures utilizing them would coalesce upon cooling.

The protective colloid is used in an effective amount, that is, in an amount sufficient to promote the formation of and/or stabilize a phenolic resin-in-water dispersion. It is sufficient that the dispersion be stable while the reaction mixture is being agitated to the degree ordinarily associated with the production of phenolic resins. It is desirable for the dispersion to settle on standing within a reasonable time, such as a few minutes, in order to facilitate separation of the particulate resin phase from the aqueous phase. Of course, when the resin phase settles, it should not coalesce to a non-particulate mass. This capability is a function of both the substantial water-insolubility of the resin and the protective colloid.

It is desirable to use the protective colloid in a minimum effective amount, because when excessive amounts are used the dispersion may take an impractically long time to settle on standing. While the precise proportions needed may vary somewhat from one case to another, and can be determined by routine experimentations, a minimum effective amount will normally be from about 0.1 to about 0.5 weight percent, based on the weight of the phenolic component. It is rare that the protective colloid will be used in amounts of more than about 5 weight percent. A preferred proportion is about 1 to 2 weight percent.

The reaction is carried out in an aqueous medium. The minimum amount of water that should be used is that proportion which will permit the formation of a phenolic resin-in-water dispersion. While the minimum amount of water needed will vary somewhat from one formulation to another, as a rule at least 50 parts by weight of water should be provided for 100 parts by weight of phenolic resin. The weight of phenolic resin is equal to the weight of phenol, formaldehyde, and amine charged to the reaction, minus the amount lost as water of condensation. A moderate excess over the minimum amount of water is recommended. There is no advantage to using a large excess, which is undesirable because reactor productivity will be reduced, although the process will be operable with the large excess of water.

The particulate resole formation step can be carried out by charging all the components of a conventional reaction vessel, such as the type that has been used for over fifty years in making phenolic resins, and heating the reaction mixture, while agitating, to an elevated temperature. It is preferable to charge the protective colloid at the beginning of the reaction, although it could be added during a later step, if desired, up to the point that molecular weight build-up of water insoluble products occurred, as evidenced by clouding of the reaction mixture. A reaction temperature of about 80° to 85° C. has been found to be convenient, although a temperature of from about 70° to about 100° C. could be used in some cases. At lower temperatures, below, for example, about 55° C., the reaction becomes impracticably slow. At temperatures much above 100° C., it may be too difficult to control the reaction in large scale batch equipment. A few minutes after reaching reaction temperature, the mixture will become cloudy. The progress of the condensation reaction can be followed by periodically withdrawing samples and testing the samples for the 150° C. hotplate gel time (a procedure known to all phenolic resin chemists). The desired gel time may vary, but it will usually be reached in about 60 to 90 minutes at 80° to 85° C. The temperature can be maintained during the reaction by standard heating or cooling means, as required. In commercial size batches, vacuum reflux is a convenient way to maintain desired temperature.

When the desired gel time has been reached, the mixture is cooled to below about 40° C., and preferably below about 20° C., to quench the reaction. The most preferred quenching temperature is between 15° to 20° C.

Alkaline Treatment

It has been discovered that the addition of a dilute solution of an alkaline compound, containing an alkali or alkaline earth metal, to the cooled, particulate resole resin formed in the process described above, produces a surprisingly large change in the physical properties of the resole resin. This result is particularly unexpected in view of the disclosure in the Wynstra et al. patent, at Example 11, that the addition of alkali metal hydroxides, such as NaOH or $Ba(OH)_2$, during the particulate resole resin formation reaction per se prevents formation of particulate solids. Furthermore, the addition of alkaline compounds, such as alkali metal hydroxides, to particulate resole resin powders would promote caking and sintering due to the development of alkaline droplets within the powdered resins. In addition, such a blend generates substantial handling problems including dermatitis, inhalation, and the like when exposed caustic solutions are involved. In contrast, the present invention provides for a process for incorporating alkaline compounds, such as alkali and alkaline earth metal compounds, into the resole resin while still retaining the resin in its original particulate form. Preferred alkaline compounds are the alkali and alkaline earth metal hydroxides, and most preferably NaOH and KOH.

It is preferred that during during the alkaline treatment the temperature should be kept below 20° C. to minimize degradation of the protective colloid. The alkaline compound is preferably stirred into the resin dispersion for a period of time sufficient to modify the physical properties of the particulate resole resin product. This time will vary depending upon such conditions as the proportional amounts of alkaline compound to particulate resole resin as well as particle size. The alkaline treatment will usually take less than 10 hours, and preferably takes from about 0.5 to 2 hours. Most preferably, the alkaline compound is added to the aqueous mixture and agitated for about one hour. The alkaline compound is preferably added in the form of an aqueous solution wherein the concentration of the alkaline compound can vary, depending upon the particular compound used. The aqueous concentration is usually from about 1 to 50 weight percent, preferably from about 10 to about 30 weight percent, and most preferably 20 to 25 weight percent. The amount of alkaline compound which may be added can be up to the amount required to convert all the phenolic hydroxyls in the resin to the corresponding alkaline phenates. In terms of weight percent of phenolic component in the resole resin, the amount of alkaline compound added can range from about 0.1 to about 25 weight percent, preferably about 1 to about 5 weight percent and most preferably from about 2 to about 2.5 weight percent. The amount of alkaline compound which is incorporated into the resole resin can vary depending upon the concentration of alkaline compound, as well as the duration of the alkaline treatment.

Adjuvants

Other components can be added to the particulate resole resins to aid in their production or provide additional properties in the product, such as release agents, including zinc stearate or Bohemia wax; lubricants and dust suppressants, such as mineral oil; flow promoters, such as fumed amorphous silica or lignin derivatives; colorants, such as carbon black or $TiO_2$; fillers, such as asbestos, wood flour, glass fibers or flakes, mineral wool or talc; and other powdered resins which are reactive with resoles, such as novolac phenolic resins, as well as urea, melamine or epoxy resins.

Product Isolation

The treated resole resin can then be recovered from the aqueous dispersion using separation procedures well established in the art. One such procedure includes filtration of the aqueous dispersion to produce a wet filter cake. In commercial scale operation, centrifigation may be preferred to filtration. The filter cake can then be washed with pure water, at 20° to 30° C., filtered again, and then dried. During the final drying step, gentle agitation is desirable in order to deter agglomeration of the particles.

The resulting particulate resin is generally a free-flowing powder that has superior resistance to sintering, as well as an increased curve rate. The powder can be used for the classical phenolic resin applications such as fiber bonding, molding, adhesives, and the like. As a result of the improved cure rate, the resin is particularly useful in particle board and wafer board manufacture where shorter cycle times are desirable.

Mechanism

Without wishing to be bound to any particular theory of operation, it is believed that the alkaline treatment of particulate resole resins formed by the process described above, causes some of the hydroxylic groups in the resin particles to be converted to form alkaline phenates, according to the following equation:

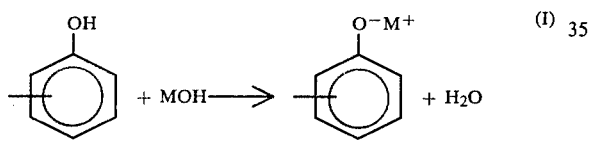

wherein M is a metal selected from Group I or Group II of the periodic table of elements. This result would impart a degree of ionic character to the resole resin molecules and at the same time incorporate an alkaine cure accelerator.

Product Analysis

Physical tests on the isolated resole resin, which has undergone the alkaline treatment described above, show a substantial increase in cure rate of the dry resole. As with conventional resole resin processing, cure rate can be measured based on gel time and plate flow values using well established procedures.

The alkaline treated resole resins also exhibit improved properties in sinter resistance, evidenced by increases in the glass transition temperature, $T_g$. It is believed that this increase in $T_g$ is due to an increase in the "ionic" content of the polymer, since similar increases in $T_g$ have been observed for sodium salts of styrenemethacrylic acid copolymers where the $T_g$ increases about 3° C. for each mole percent of sodium methacrylate.

A measure of the amount of alkaline compound which has been incorporated into the resole resin can be made using the ash level of the resole resin, due to the fact that the ash contains residual alkaline compounds, such as alkaline oxides, e.g., $Na_2O$ when NaOH is used.

EXAMPLES

The chemical designations used in the examples are defined as follows:

| Designation | Description |
| --- | --- |
| Formalin | An aqueous solution containing 50% formaldehyde |
| Hexa | Hexamethylenetetramine |
| Novolac I | A commercially available particulate novolac phenolic resin containing 6% hexa. |
| Phenol | Monohydroxybenzene |
| PVA | A commercially available polyvinyl alcohol/vinyl acetate copolymer having a molecular weight of 10,000 and a degree of hydrolysis of 88%. |
| Resin I and III | Particulate resole phenolic resins used in wafer board applications. |
| Resin II | A commercially available particulate resole phenolic resin used in wafer board applications. |
| Resole I and II | Particulate resole phenolic resins prepared by the process described in U.S. Pat. No. 4,206,095 (Wynstra et al.). |
| Resole III | A commercially available particulate resole phenolic resin used in wafer board applications. |

EXAMPLE 1

This example illustrates a general procedure for carrying out the process of the invention, and the effect of varying the alkaline treatment procedure.

A standard formulation was employed for many of the examples reported herein. This formulation was selected for convenience, and is not necessarily an optimized formulation for any particular end-use application. The components of the reaction mixture are shown in Table 1 below:

TABLE 1

| Component | Parts By Weight | Grams | Moles per mole phenol |
| --- | --- | --- | --- |
| Phenol | 100 | 250 | 1 |
| Formalin | 72 | 180 | 1.13 |
| Water | 110 | 275 | |
| Hexa | 9 | 22.5 | 0.06 |
| PVA | 0.4 | 1.0 | |

The formulation contained 1.48 equivalents of methylene per mole of phenol, and 0.24 equivalents of amino nitrogen per mole of phenol.

Condensation

The phenol, formalin and 275 g of water were weighed into a 1 liter flask which was equipped with a motor-driven paddle stirrer, a thermometer, and a reflux condenser. After adding the Hexa and PVA, the batch was heated to 85° C. Within ten minutes at 85° C., the originally clear solution became very opaque, i.e., the cloud point was reached, such that the batch had the appearance of a dispersion. The batch was maintained at 85° C. for a total of 70 minutes and then cooled in an ice-water bath. 182 g of water were added while the batch continued to cool to between 10°–15° C. The batch was filtered through a Buchner funnel, with the resulting filter cake subjected to a displacement wash with ice-water, and a portion then allowed to dry.

Alkaline Treatment

A first sample of 100 g of the filter cake was combined with 100 g of water to create a slurry, in a beaker cooled in an ice-water bath. After the slurry had been generated through agitation, the solution of 2 g NaOH in 20 ml of water was added dropwise to the beaker. The slurry was mixed for 1½ hours while maintaining the bath temperature at approximately 10° C. The mixture was then filtered, washed with cold water and dried. A second sample containing 70 g of the particulate resole resin was slurried with 70 ml of water in a beaker subjected to an ice-water bath. The solution of 2.5 g 85% KOH (i.e., 2.1 g KOH) in 14 g of water was slowly added to the slurry to produce a mixture having a pH of 11.50. The slurry was mixed for 1 hour, filtered, washed with cold water and dried.

Analysis of the two alkaline treated samples, along with an untreated sample, produced the results listed in Table 2 below. The decreased gel time and plate flow values indicate a substantial increase in the cure rate of the dry resole. The increases in $T_g$ demonstrate improved sinter resistance in the particulate resole resin.

TABLE 2

| Example | Protective Colloid | Alkaline Compound | Parts/100 parts phenol | Gel time[a], sec | Plate Flow[b], mm | Ash Content % | Glass Transition Temperature, °C. |
|---|---|---|---|---|---|---|---|
| 1 | PVA | None | — | 95 | 88 | 0.0 | 47.3 |
|  | PVA | NaOH | 2.0 | 60 | 29 | 1.7 | 61.3 |
|  | PVA | KOH | 2.5 | 51 | 21 | 2.1 | 60.5 |
| 2 | Gum arabic | None | — | 89 | 77 | 0.13 | 52.0 |
|  | Gum arabic | NaOH | 2.0 | 46 | 13 | 0.89 | 62.8 |
|  | Gum arabic | KOH | 2.5 | 68 | 38 | 0.38 | * |

*data not available
[a]at 150° C.
[b]at 125° C.

EXAMPLE 2

Another batch of particulate resole resin was produced using the formulation and procedures set forth in Example 1, except that the PVA protective colloid was replaced with 1.4 parts (3.5 g) of gum arabic. The results in Table 2 show similar decreases in gel time and plate flow values for the samples undergoing alkaline treatment indicating an increase in the cure of the dry resole. Increases in $T_g$ also occurred which were a measure of increased sinter resistance. In both examples increases in the level of ash content reflect the fact that the alkaline compounds have been incorporated into the particulate resole resin.

EXAMPLE 3

In this example, the same procedures and formulation were used as set forth in Example 2 above to produce a particulate resole resin, except that the amount of alkaline compound added during the alkaline treatment step was varied. Separate samples containing 0.5, 1.0 and 3.0 parts NaOH/100 parts phenol, as opposed to 2.0 parts Example 2, were prepared with the results given in Table 3. The results show that gel time and plate flow values decrease, at nearly a linear rate, when the amount of alkaline compound utilized is increased. The ash content values show that alkali metal incorporated into the particulate resole resin increases with the increase in the amount of alkaline compound used. A plot of ash content versus $T_g$ for the samples listed in Tables 1 and 2, shows that a linear dependence exists defining a 22° C. increase in glass transition temperature for each percentage of $Na_2O$ (the residue of the alkaline treatment) in the ash.

TABLE 3

| Parts NaOH/ 100 parts phenol | Gel Time, seconds | Plate Flow, mm | Ash Content, % | Glass Transition Temperature, °C. |
|---|---|---|---|---|
| None | 96 | 86 | 0.11 | 54.0 |
| 0.5 | 86 | 74 | 0.14 | * |
| 1.0 | 76 | 62 | 0.20 | 58.5 |
| 2.0 | 46 | 14** | 0.89 | 62.8 |
| 3.0 | 34 | 14** | 1.43 | 82.8 |

*data not available
**no flow, 14 mm equals pellet diameter

EXAMPLE 4

This example demonstrates the effect of hold time on (2% NaOH) alkaline treated particulate resole resins. The procedures and formulations used to produce the 2% NaOH treated particulate resole resin in Example 1 were followed, except that the hold time at 85° C. during the production of the particulate resole was reduced from 70 minutes to 60, 62 and 65 minutes for three separate samples. The results, given in Table 4, show a reduction in gel time and plate flow values, indicating an increased cure rate for the dry resole, as the hold time in increased. These results, along with the results in the previous Examples, show that the particulate resole resins with similar gel time and plate flow requirements can be obtained using two separate procedures, depending upon the hold time or amount of alkaline compounds utilized.

TABLE 4

| Hold Time at 85° C. | Gel Time, seconds | Plate Flow, mm |
|---|---|---|
| 60 | 75 | 67 |
| 62 | 72 | 54 |
| 65 | 67 | 44 |
| 70 | 60 | 29 |

EXAMPLE 5

Some of the alkaline treated particulate resole resin produced Example 2 was evaluated in wafer board applications and compared with resins normally used for such applications. The results, shown in Table 5, indicate that alkaline treated particulate resole resin is roughly equivalent to the other resins in each of the properties measured, i.e., internal bond, modulus of rupture and modulus of elasticity. The alkaline treated, particulate resole resins are shown to have sufficiently fast curing rates to be useful in those applications requiring rapid cycle times.

TABLE 5**

| Resin | Press Cycle minutes | Internal Bond* | Modulus of Rupture* | Wet Modulus of Rupture* | Modulus of Elasticity* | Wet Modulus of Elasticity* |
|---|---|---|---|---|---|---|
| Alkaline | 5 | 34 | 2720 | 1070 | 517,200 | 139,700 |
| Treated Resole | 6 | 33 | 2880 | 1470 | 525,200 | 266,200 |
| Resin I | 5 | 37 | 3130 | 2200 | 603,600 | 341,000 |
|  | 6 | 40 | 2920 | 610 | 454,200 | 231,300 |
| Resin II | 5 | 35 | 2600 | 910 | 554,000 | 207,700 |
| Resin III | 6 | 36 | 2870 | 1950 | 500,200 | 253,300 |

*all values given in psi.
**all tests conducted using Commercial Standard CS236-66.

EXAMPLE 6

In this example, the alkaline treated particulate resole resins are compared with several long plate flow phenolic resins in terms of their glass transition temperatures, $T_g$. It is apparent that the alkaline treated particulate resole resins have $T_g$'s of from 5° to 10° C. above the values for other particulate resole resins, conventional resole resins as well as certain novolak resins. This increase in $T_g$ reflects an increase in the sinter resistance which would benefit the application of the alkaline treated particulate resole resins in such areas as fiber bonding.

TABLE 6

| Resin | Plate Flow, mm | $T_g$ °C. |
|---|---|---|
| Example 4[1] | 67 | 55.5 |
| Example 4[2] | 54 | 54.3 |
| Resole I | 62 | 46 |
| Resole II | 48 | 46 |
| Resole III | 60 | 48 |
| Novolac I | 85 | 49 |

[1]60 minute hold time at 85° C.
[2]62 minute hold time at 85° C.

EXAMPLE 7

The shelf life of the alkaline treated, particulate resole resin was investigated and compared with the shelf life of untreated particulate resole resin. The results shown in Table 7, were analyzed using a fiber order aging equation of:

$$k = \frac{\delta \ln \frac{1}{PF - 13}}{\delta t} \quad (II)$$

Wherein k is the aging rate constant; PF is the plate flow values determined at 125° C., measured in mm; and t is time, in days. Linear analysis for the values listed in Table 7 establishes aging rate constants of 0.086 days $^{-1}$ for the alkaline treated particulate resole resin, and 0.080 days $^{-1}$ for the untreated particulate resole resin. The result is that alkaline treated particulate resole resin ages approximately 7% faster than the untreated particulate resole resin. Although the higher $T_g$ of the treated resin would result in the resin molecules being less mobile, and therefore providing a slower rate of aging, it is evident that this factor is outweighed due to the higher reactivity which would be expected for the alkaline treated material.

TABLE 7[1]

| | Alkaline Treated Particulate Resole[2] | | Untreated Particulate Resole | |
|---|---|---|---|---|
| Day | Plate Flow, mm | Plate Flow, Ratio | Plate Flow, mm | Plate Flow, Ratio |
| 0 | 54 | 0.0244 | 62 | 0.0204 |
| 1 | 50 | 0.0270 | 58 | 0.0222 |
| 2 | 46 | 0.0303 | 55 | 0.0233 |
| 3 | 50 | 0.0270 | 55 | 0.0238 |
| 6 | 38 | 0.0400 | 42 | 0.0345 |
| 9 | 31 | 0.0556 | 36 | 0.0435 |
| 13 | 27 | 0.0714 | 32 | 0.0526 |

[1]all values were determined for 40° C.
[2]from Example 4, 62 minute hold time

I claim:

1. A process for producing a particulate, resole resin comprising the steps of: (a) reacting (1) formaldehyde, (2) a phenol, and (3) an effective amount of hexamethylenetetramine or a compound containing amino hydrogen, or mixtures thereof; in an aqueous medium containing an effective amount of a protective colloid, for a period of time sufficient to produce a particulate, resole resin dispersed in the aqueous medium; (b) cooling the reactive mixture to below about 40° C.; (c) reacting the cooled reaction mixture with an alkaline compound for a period of time sufficient to produce a treated resin exhibiting increased cure rates and increased sinter resistance; and (d) recovering the resin from the aqueous dispersion.

2. The process of claim 1 wherein the alkaline compound is alkali or alkaline earth metal hydroxide.

3. The process of claim 2 wherein the alkaline compound is sodium hydroxide or potassium hydroxide.

4. A particulate, resole resin produced by the process according to claims 1, 2 or 3.

5. A particulate, resole resin comprising the product of: (1) formaldehyde; (2) a phenol; and (3) an effective amount of hexamethylenetetramine or a compound containing amino hydrogen, or mixtures thereof; which is produced in an aqueous medium containing an effective amount of a protective colloid, for a period of time sufficient to produce a particulate, resole resin dispersed in the aqueous medium; said particulate resole resin being cooled to below about 40° C.; and wherein a sufficient amount of hydroxyl groups in the resin have been converted to form alkaline phenates to produce a treated resin exhibiting increased cure rates and increased sinter resistance.

6. The particulate, resole resin of claim 5 wherein the alkaline phenates are sodium phenate or potassium phenate.

* * * * *